United States Patent

[11] 3,594,046

| [72] | Inventor | Claude J. Marshall<br>Ann Arbor, Mich. |
|---|---|---|
| [21] | Appl. No. | 808,208 |
| [22] | Filed | Mar. 18, 1969 |
| [45] | Patented | July 20, 1971 |
| [73] | Assignee | North American Rockwell Corporation<br>Pittsburgh, Pa. |

[54] WHEEL COVER
8 Claims, 6 Drawing Figs.

| [52] | U.S. Cl. | 301/37 P |
|---|---|---|
| [51] | Int. Cl. | B60b 7/02 |
| [50] | Field of Search | 301/39 |

[56] References Cited
UNITED STATES PATENTS

| 2,842,405 | 7/1958 | Lyon | 301/37 |
|---|---|---|---|
| 3,252,739 | 5/1966 | Huntley | 301/37 (P) |
| 3,416,840 | 12/1968 | Gibbings | 301/37 (P) |

FOREIGN PATENTS

| 450,813 | 8/1948 | Canada | 301/37 (P) |
|---|---|---|---|

*Primary Examiner*—Richard J. Johnson
*Attorneys*—George R. Powers and John R. Bronaugh ABSTRACT: A two-piece automotive wheel cover including a central circular decorative member and a metal ring surrounding the periphery of the decorative member with radially outwardly projecting tapered locking bosses spaced around and extending from the periphery of said decorative member engaged in openings in a normally generally cylindrical flange of said mounting ring to lock the assembly together, the configuration of said bosses being such as to locally and elastically displace said flange radially outwardly, giving said flange an overall slightly noncylindrical shape, the resilience of said flange holding said mounting ring in firm, rattle-free engagement with said decorative member even when the wheel cover shrinks within anticipated limits.

PATENTED JUL 20 1971 3,594,046

INVENTOR.
CLAUDE J. MARSHALL

WHEEL COVER

This invention relates to a low cost automotive wheel cover having a central decorative portion and a peripheral metal ring resiliently engaging the central decorative portion.

As is well known to those familiar with the art, the retention of a wheel cover on an automotive wheel involves substantial problems due to the shocks and strains which are encountered in normal driving and which tend to dislodge the wheel cover from the wheel. It is obvious for example, that when the wheel strikes an obstruction in the road, or passes over a curbing or a hole in the road, the abrupt deceleration of the wheel and the inertia of the wheel cover tend to cause the latter to separate from the wheel. Less apparent is the fact that even in straight line driving along a smooth road, a portion of the weight of the automobile is imposed against the bottom of each wheel, causing a slight flattening of that side of the wheel, imperceptible to the eye but of significant magnitude, and as the wheel rotates, the position of this flattened portion is continually moving around the circumference of the wheel. This flattening effect is aggravated when the wheel strikes an obstruction or even when the automobile turns a corner so that the weight is concentrated on the two outside wheels. Even more significantly, the transverse forces imposed on the tread of the tire, due to the inertia and the centrifugal force of the car as it turns, are transmitted through the tire to the rim of the wheel, twisting the wheel out of planar alignment. The wheel is subjected to still other complex stresses when the brakes are applied, and so on.

Providing a wheel cover having retention means capable of holding the wheel cover on the wheel against such shocks and distortions of the wheel obviously involves substantial problems.

Moreover, it is very important that the retention means not only prevent accidental outward movement of the wheel cover but also prevent rotation of the wheel cover relative to the wheel, not merely to keep the valve stem hole in the wheel cover aligned with the valve stem and, where the valve stem or valve stem extension projects through such hole, to prevent twisting or breakage of the stem or extension thereof, but also because relative rotation of the wheel cover will almost inevitably cause the wheel cover gradually to work its way off of the wheel.

Since it is often necessary to change a tire in an area remote from a service station and under adverse conditions such as darkness, rain, cold and so on, it is important that the wheel cover be capable of being easily and properly applied by persons who are unskilled and unexperienced and have no instructions and no special tools or equipment. Since automotive prices are highly competitive, it is also important that all of the aforementioned characteristics be achieved in a wheel cover which is simple and economical in construction. And, since styling is an extremely important factor in the selection of automobiles, it is also imperative that the wheel covers present an attractive appearance. Finally, in this day of quiet engines, transmissions, bodies and suspensions, it is highly desirable that the wheel cover be permanently rattle free under all anticipated conditions, both intrinsically and in its attachment to the wheel.

The present invention provides an extremely low-cost wheel cover which satisfies all of the aforementioned desirable objectives. The low cost is accomplished principally by making the wheel cover in two pieces: a central, decorative member preferably of molded synthetic resin, and an outer metal ring which is attached to the periphery of the decorative member. The construction of these two components is such that they may be permanently adjoined by merely pressing them together, the assembly being rattle-free even when the decorative member shrinks due to aging or to low temperatures. By a further aspect of the invention, the outer metal ring includes spring retaining fingers engageable with a generally axially extending generally cylindrical flange on the rim of the wheel to maintain the wheel cover in position on the wheel.

Figure 1:
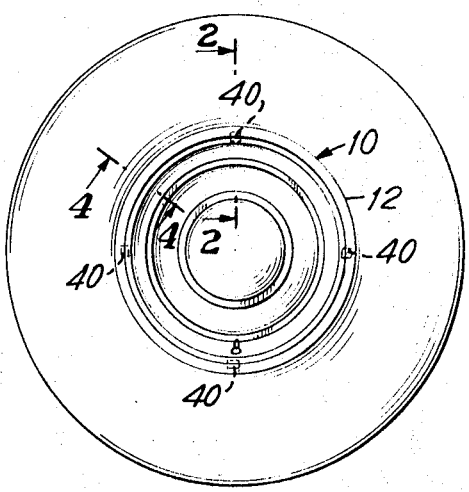
FIG. 1 is a front elevational view of an illustrative wheel cover embodying features of the present invention, shown mounted on an automotive wheel.
Figure 2:
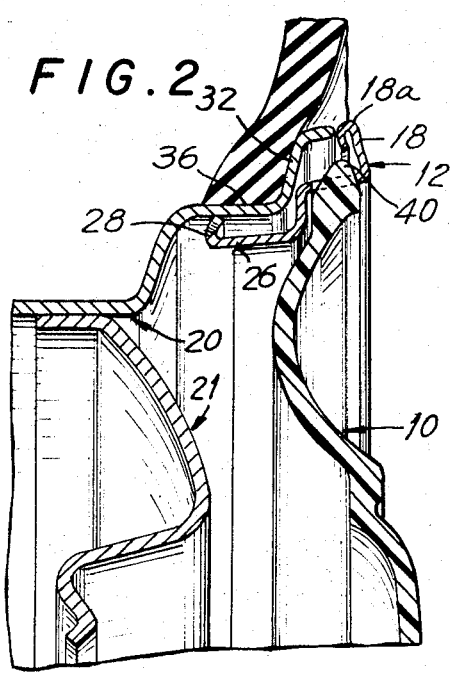
FIG. 2 is a fragmentary cross section, at enlarged scale, taken on the line 2–2 of FIG. 1.

As may be seen particularly in FIGS. 1 and 2, the illustrative wheel cover includes a central, circular decorative member 10 molded of a synthetic resin, for example a thermoplastic resin such as vinyl chloride-acetate copolymer, acrylonitrile-butadiene-styrene, polypropylene or polystyrene, although thermosetting resins, such as phenol formaldehyde, may also be used. The particular contour of the decorative surface of the member 10 which is shown is, of course, for purposes of illustration only and the design is subject to almost infinite variation.

Surrounding the periphery of the decorative member 10 is a mounting ring 12 preferably formed of a strip of metal, for example stainless steel, stamped and die rolled to the proper cross-sectional shape, and to circular form, cut to a length corresponding to the circumference of the decorative member 10, with its end butted and welded or riveted together to form a ring.

Figure 3:
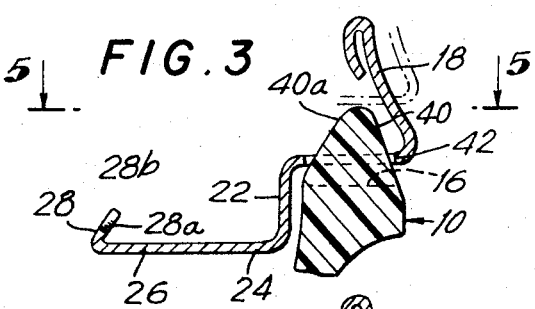
FIG. 3 is an enlargement of the portion of FIG. 2 which includes the upper edge of the central decorative member and the mounting ring thereon.
Figure 4:
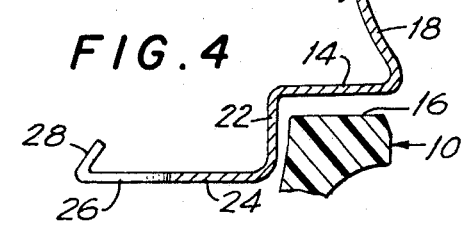
FIG. 4 is an enlarged fragmentary sectional view similar to FIG. 3, but taken on the line 4–4 of FIG. 1.
Figure 5:
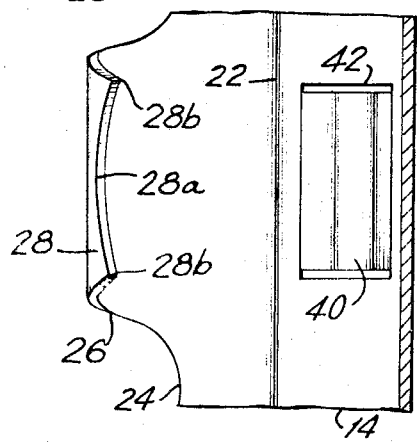
FIG. 5 is a sectional view on the line 5–5 of FIG. 3.
Figure 6:
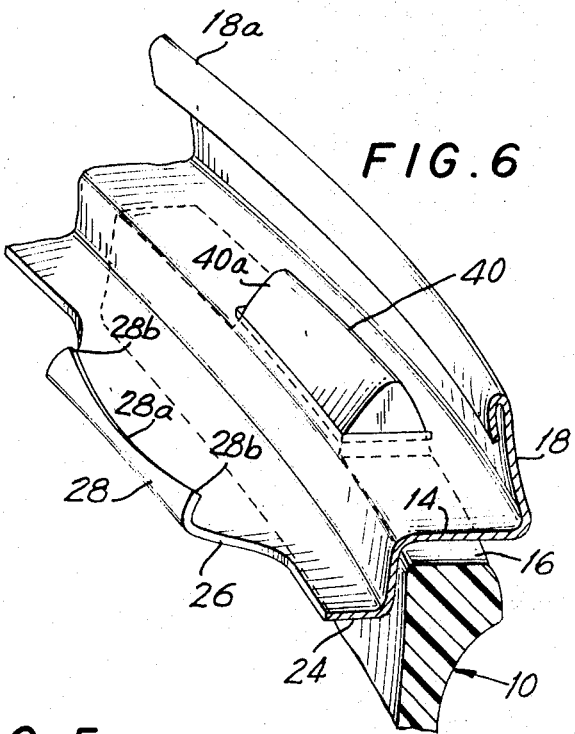
FIG. 6 is a fragmentary perspective view of the portion of the mounting ring shown in FIGS. 3 and 5.

As best shown in FIGS. 3 and 5, the mounting ring 12 is shaped to include a generally cylindrical mounting flange 14 directly overlying the peripheral edge 16 of the decorative member 10 and preferably having an inside diameter slightly exceeding the general diameter of the decorative member 10, so that the flange 14 is slightly spaced radially outwardly from the peripheral edge 16, as best shown in FIG. 4. Projecting generally radially outwardly from the front side of the flange 14 is an annular skirt portion 18 which overlies and conceals the lip 19 of the rim 20 of an automobile wheel 21 on which the wheel cover is mounted. The peripheral edge 18a of the skirt portion 18 is preferably folded rearwardly and inwardly to form a bead which gives the cover a smooth rounded edge, and also stiffens the margin of the skirt portion. Projecting generally radially inwardly from the rear side of the mounting flange 14 is an annular shoulder 22, and projecting generally axially rearwardly from the inner side of the shoulder 22 is a generally cylindrical supporting flange 24 which extends completely around the mounting ring 12.

Projecting generally axially rearwardly from the rear edge of the supporting flange 24 at spaced positions around the periphery of the mounting ring 12 are a plurality (for example, 16) of integral spring retaining fingers 26 which are bent at their outer ends to provide relatively short and stiff terminal portions 28 which extend generally radially outwardly and slightly forwardly. The outer edges 28a of these terminal portions 28 lie substantially along a common circle of such diameter that, as the wheel cover is pressed inwardly onto an automobile wheel, the sloping rear surfaces of the terminal portions 28 will engage the curved juncture between a generally radially extending annular surface 32 of the rim 20 of the wheel and an adjacent generally axially extending, generally cylindrical flange 36 of the rim, camming the spring fingers 26 resiliently inwardly. When the wheel cover is fully seated on the wheel, as shown in FIG. 2, the upper margin of the shoulder 22 abuts the annular surface 32 of the rim 34, while the resilience of the spring fingers 26, reinforced by the structural rigidity of the continuous cylindrical flange 24, maintains the edges 28a of the terminal portions 28 in high pressure engagement with the flange 36.

As shown in FIGS. 4 and 5, the outer edge 28a of each of the terminal portions 28 is shaped, for example with an arcuate indentation intersecting the side edges of the terminal portions, to form sharp projecting spurs or cusps 28b which bite into the surface of the flange 36 to enhance the frictional engagement between the wheel cover and the rim and strongly resist accidental removal of the wheel cover as well as rotation of the wheel cover relative the wheel.

In accordance with the invention as best shown by FIG. 3, the mounting ring 12 is secured to the decorative member 10 by means of a plurality (for example, four as shown in FIG. 1) of locking bosses 40 projecting generally radially outwardly from the peripheral edge 16 of the decorative member 10 at equally spaced positions around said peripheral edge and into rectangular holes 42 of the mounting ring 12. The rear faces 40a of these locking bosses 40 are chamfered or inclined to form cam surfaces to facilitate assembly of the mounting ring 12 and the decorative member 10 by merely pressing the mounting ring forwardly (to the right as viewed in FIGS. 1—3) relative to the decorative member. During such relative movement, the curved juncture of the skirt portion 18 and the flange 14 engages the cam surfaces 40a of the bosses 40, camming the mounting ring 12 outwardly in the areas local to the bosses 40, thus resiliently distorting the mounting ring to noncircular form (and perhaps to a lesser extent displacing the bosses 40 radially inwardly by resiliently dishing the decorative member 10), until the bosses 40 come into alignment with the holes 42, allowing the parts to snap back more nearly to their normal circular form. However, the thickness of the bases of the tapered bosses 40 exceeds the width of the holes 42 so that only the thinner outer portions of the bosses can project through the holes and the height of the bosses 40 is such that the flange 24 cannot return fully to circular form, but remains resiliently distorted to slightly noncircular form. This keeps the two parts in a firmly compressive and rattle-free assembly even though the decorative member 10 should shrink to an appreciable extent due to aging (and consequent sublimation of plasticizer, for example). Similarly, this resilient engagement maintains the parts in rattle-free assembly even when subjected to low temperature and substantial differential contraction between the decorative member and the mounting ring.

I claim:

1. A wheel cover for a multiflanged drop center automotive wheel, comprising a circular decorative member, a metal mounting ring extending around the periphery of said decorative member, said mounting ring having a generally axially extending generally cylindrical mounting flange overlying the periphery of said decorative member, a plurality of tapered locking bosses projecting radially outwardly from said peripheral edge at spaced positions therearound into engaging means in said mounting flange, the configuration of said bosses being such as to keep at least one of such assembled parts resiliently distorted to noncircular form and insure firm compressive engagement between them under normal conditions, said mounting ring also including means for engaging a generally cylindrical flange on the rim of said wheel to secure said wheel cover against accidental removal from and rotation relative to said wheel, said engaging means comprise holes in said mounting flange, at least one dimension of said holes being less than the corresponding dimension of said tapered locking bosses at radial locations capable of being aligned with said mounting flange when both said decorative member and said mounting ring are undistorted, whereby only the outer portions of said bosses can project into said holes and at least one of said parts is resiliently distorted to noncircular form.

2. A wheel cover for a multiflanged drop center automotive wheel, comprising a circular decorative member, a metal mounting ring extending around the periphery of said decorative member, said mounting ring having a generally axially extending generally cylindrical mounting flange overlying the periphery of said decorative member, a plurality of tapered locking bosses projecting radially outwardly from said peripheral edge at spaced positions therearound into engaging means in said mounting flange, the configuration of said bosses being such as to keep at least one of such assembled parts resiliently distorted to noncircular form and insure firm compressive engagement between them under normal conditions, said mounting ring also including means for engaging a generally cylindrical flange on the rim of said wheel to secure said wheel cover against accidental removal from and rotation relative to said wheel, said engaging means comprises holes in said mounting flange and said tapered locking bosses each comprises an axially facing bevelled surface to facilitate assembly of said wheel cover, whereby said wheel cover assembly may be assembled by coaxially aligning said decorative member and said mounting ring with said axially facing bevelled surfaces adjacent said mounting ring and said holes and said tapered locking bosses axially aligned, axially pressing said parts together such that said mounting ring engages said bevelled surfaces and is elastically distorted radially outwardly therealong until said holes are reached and said mounting flange snaps radially inwardly with said tapered locking bosses projecting radially outwardly through said holes.

3. A wheel cover as described in claim 2 in which the axial dimension of said holes is less than the corresponding axial dimension of said tapered locking bosses at radial locations aligned with said mounting flange when said decorative member and said mounting ring are coaxially aligned in their undistorted states prior to initial assembly, whereby only the outer portions of said bosses can project into said holes and at least one of said parts is resiliently distorted to noncircular form.

4. A wheel cover as described in claim 3 in which said mounting flange further includes an annular skirt portion extending generally radially outwardly from the front side of said mounting flange for overlying and substantially concealing an annular marginal area of said wheel and a peripherally continuous supporting flange extending generally axially rearwardly from the rear side of said mounting flange, said means for securing said wheel cover on said wheel comprising a plurality of spring retaining fingers projecting generally axially rearwardly from said supporting flange, said fingers being bent to provide relatively short and stiff terminal portions extending generally radially outwardly and slightly forwardly therefrom, said terminal portions having outer sharp edges lying substantially along a circle of such diameter that, as said wheel cover is pressed onto said wheel, said retaining fingers will engage said cylindrical rim flange and be cammed resiliently inwardly to maintain said sharp edges in firm biting engagement with said rim flange.

5. A wheel cover as described in claim 4 in which said sharp edges are provided with one or more arcuate indentations forming sharp projecting spurs which bite into the flange of said rim.

6. A wheel cover as described in claim 5 in which said decorative member is formed of molded plastic.

7. A wheel cover as described in claim 6 in which said axially facing bevelled surfaces for facilitating assembly of said wheel cover are, when the parts are fully assembled, adjacent said supporting flange, said bevelled surfaces being engaged during assembly of said parts by peripherally spaced portions of the annular juncture between said mounting flange and said annular skirt.

8. A wheel cover as described by claim 7 in which the undistorted diameter of said mounting flange is slightly greater than the undistorted diameter of said circular member.